Figure 1:
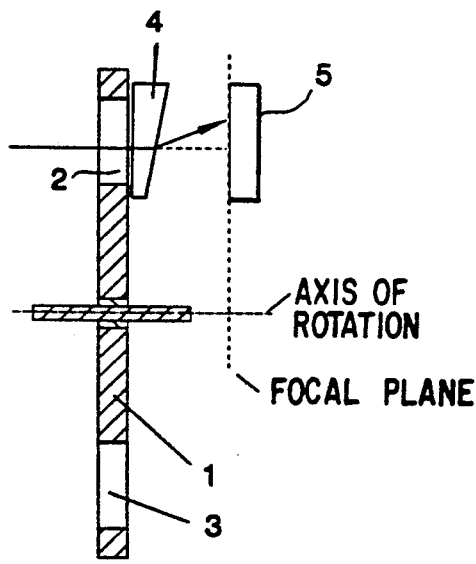

United States Patent [19]
Sibbald et al.

[11] Patent Number: 5,245,190
[45] Date of Patent: Sep. 14, 1993

[54] IMAGING ARRANGEMENT

[75] Inventors: Alastair Sibbald, Maidenhead; Elvin L. Nix, Windsor; Brian Holcroft, High Wycombe; Donald R. Barron, Sunbury-on-Thames, all of England

[73] Assignee: Thorn EMI plc, London, England

[21] Appl. No.: 718,563

[22] Filed: Jun. 20, 1991

[30] Foreign Application Priority Data

Jun. 20, 1990 [GB] United Kingdom ........... 9013715
Jun. 20, 1990 [GB] United Kingdom ........... 9013716

[51] Int. Cl.$^5$ .................................. G01J 1/22
[52] U.S. Cl. ................................. 250/351; 250/332; 250/233
[58] Field of Search ........... 250/351, 332, 232, 233, 250/339, 338.5, 350; 359/234, 235

[56] References Cited

U.S. PATENT DOCUMENTS

| | | | |
|---|---|---|---|
| 4,057,734 | 11/1977 | Barringer | 250/351 |
| 4,073,576 | 2/1978 | Bastian | 359/235 |
| 4,087,690 | 5/1978 | Prober | 250/351 |
| 4,134,269 | 3/1979 | McCormack et al. | 250/332 |
| 4,162,402 | 7/1979 | Hooper | 250/332 |
| 4,300,049 | 11/1981 | Sturm | 250/350 |
| 4,641,038 | 2/1987 | Baker | |
| 4,748,507 | 5/1988 | Gural | |
| 4,806,761 | 2/1989 | Carson et al. | |

FOREIGN PATENT DOCUMENTS

86/06214 10/1986 PCT Int'l Appl.
88/02971 4/1988 PCT Int'l Appl.
2152781 8/1985 United Kingdom.

*Primary Examiner*—Carolyn E. Fields
*Assistant Examiner*—Drew A. Dunn
*Attorney, Agent, or Firm*—Keck, Mahin & Cate

[57] ABSTRACT

An infrared imaging arrangement using a chopping device for periodically blocking exposure of an array of detector elements responsive to infrared energy by using a plurality of individually-mounted cells. There is a non-reciprocating rotary mechanism used for moving the cells substantially orthogonal to the array in such a manner that constant orientation of the cells is maintained in order to expose the array to energy via the cells. Since the cells orientation is maintained, the shift of energy relative to the array increases the arrays ability to resolve spatially sources of energy. There is also an infrared blocking piece used for blocking the infrared energy from impinging on the array.

4 Claims, 11 Drawing Sheets

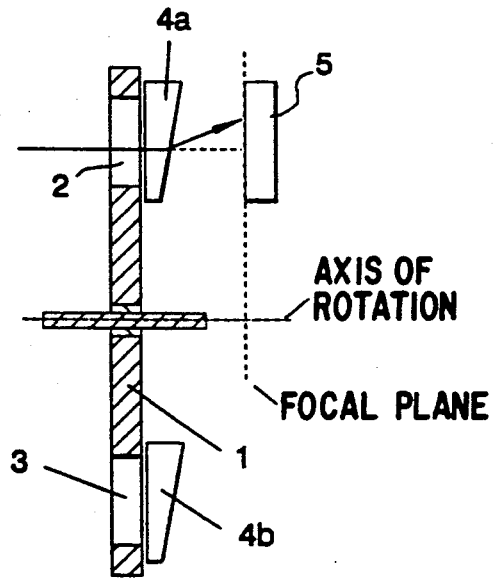
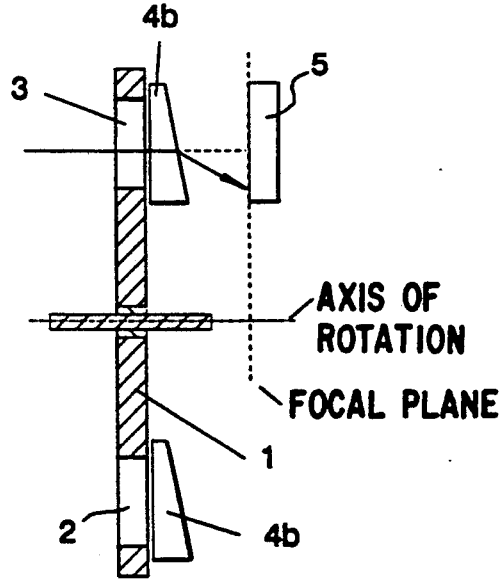
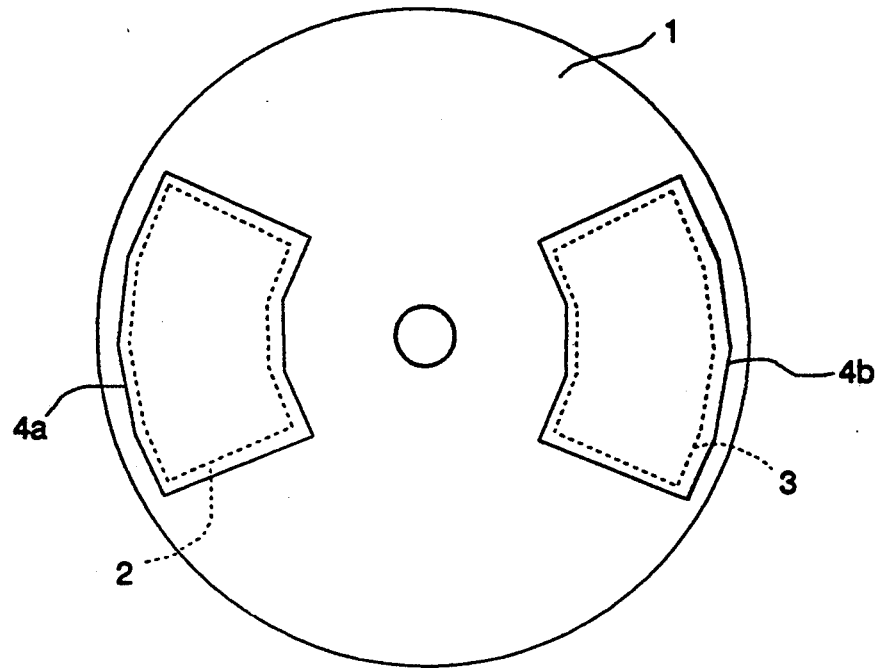

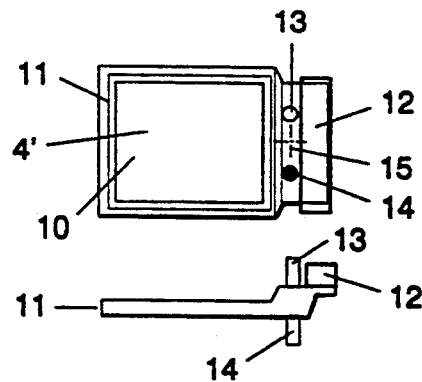
Fig.13a
Fig.13b
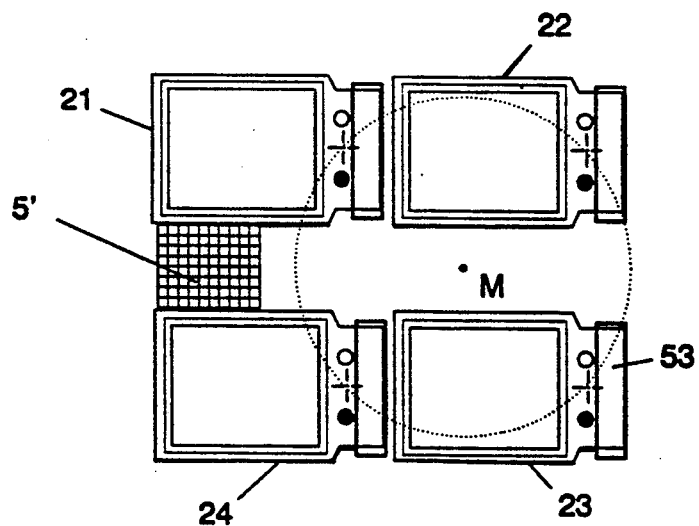
Fig.13c
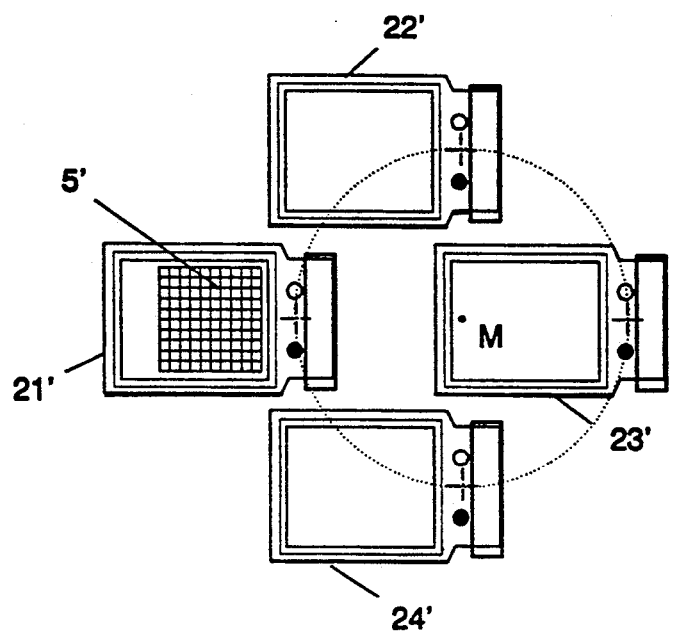
Fig.13d

IMAGING ARRANGEMENT

This invention relates to infra-red imaging arrangements and it relates more especially to such arrangements in which infra-red energy from a region of interest is constrained to impinge upon an array of detector elements sensitive to the energy in question. Usually the array of elements can be electronically interrogated to liberate electrical signals indicative of the infra-red energy distribution over part or all of the aforementioned region, and those signals are used to generate a visual representation of the region, or part thereof as the case may be. In order that the resolution of the representation so generated may be sufficient for visual appraisal or at least sufficient to permit the additional generation of interpolated data to provide a representation of reasonable quality, it is desirable that the detector elements be very small and closely packed. Practical considerations, however, such as the generation of signals of adequate strength to render them separable from the inevitable noise and the need to thermally isolate, at least to a reasonable extent, neighbouring elements and to reduce thermal and electrical interference, or so-called cross-talk, between adjacent elements, militate against the ideal configuration.

It is thus the case that, in a practical system, the sizes of detector elements and the separation between neighbouring elements are too great to permit the resolution of the ultimate visual representation to be adequate.

It is an object of this invention to remedy this situation or, at least, to reduce its effects to an acceptable level.

According to the invention there is provided an infra-red imaging arrangement comprising an array of detector elements responsive to infra-red energy, means for constraining said energy as received from a region of interest to impinge upon said array and means for periodically shifting said energy relative to said array to increase the ability of said array to resolve spatially sources of said energy in said region.

Figure 2:
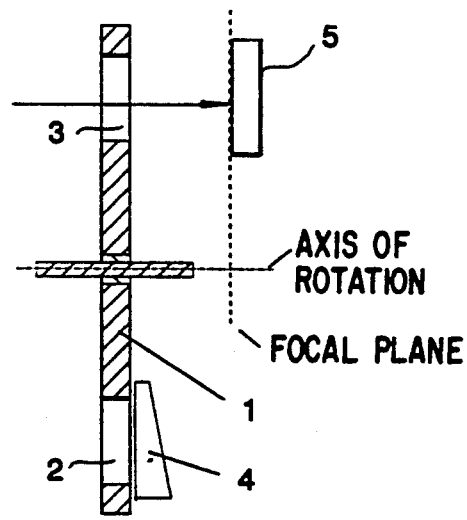
Figure 3:
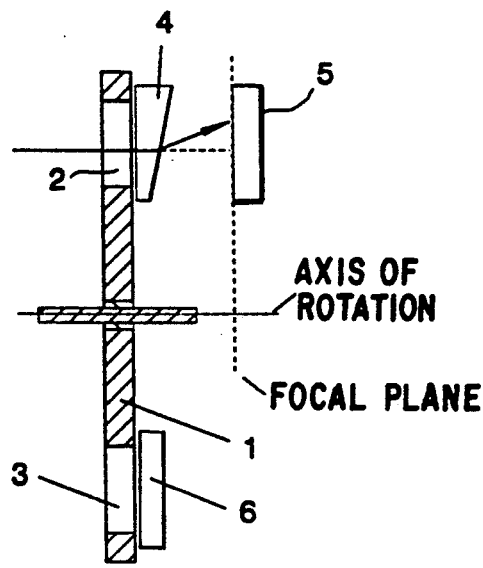
Figure 4:
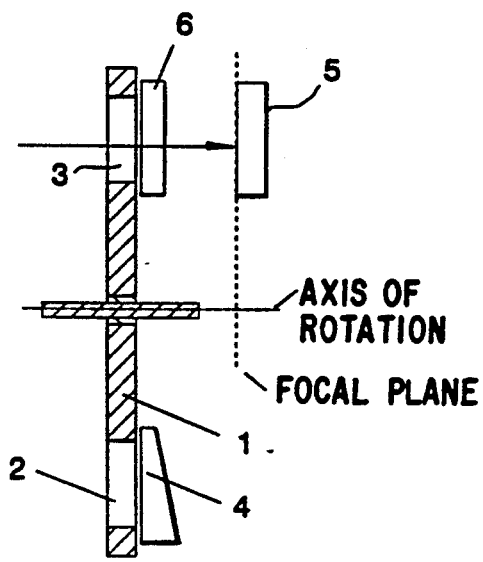
Figure 8:
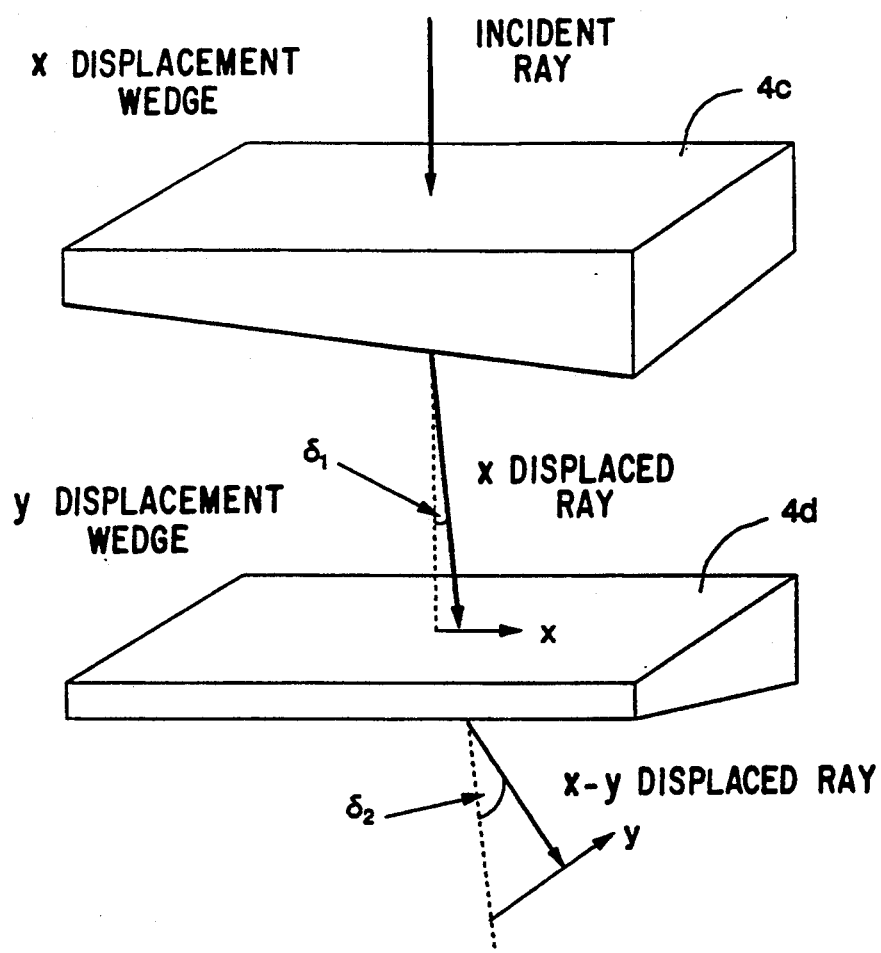
Figure 9:
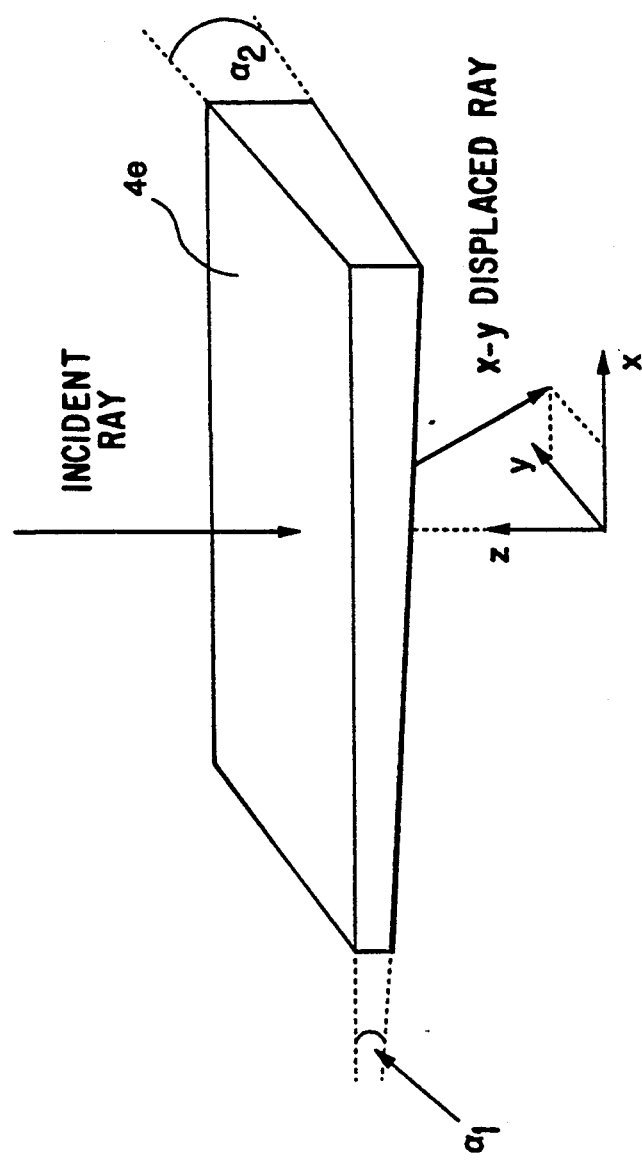
Figure 10A:
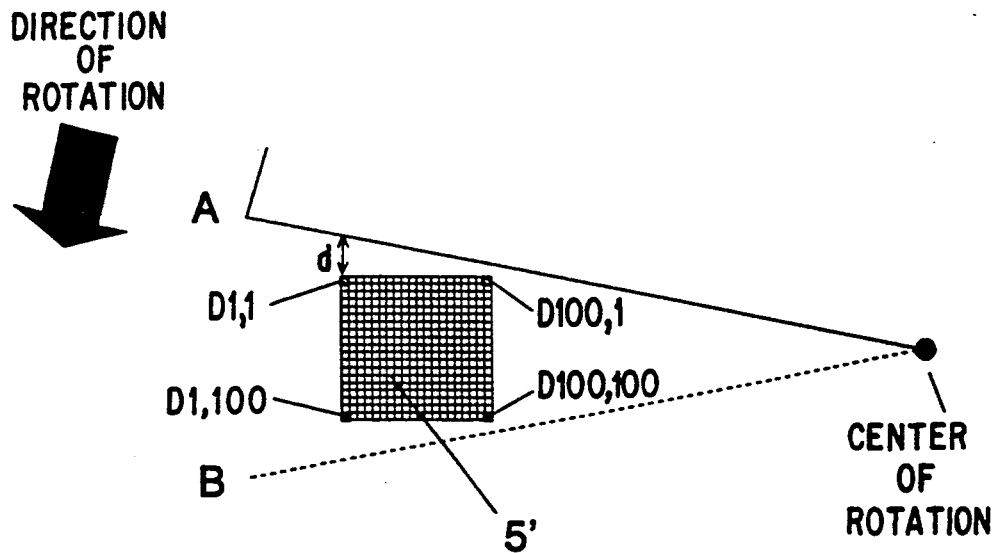
Figure 10B:
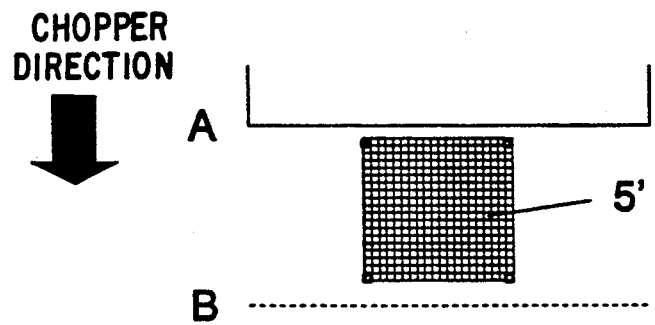
Figure 11A:
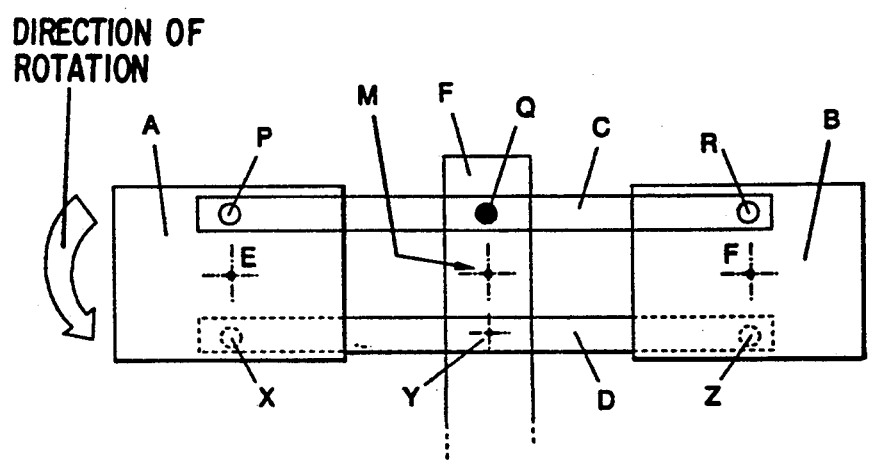
Figure 11B:
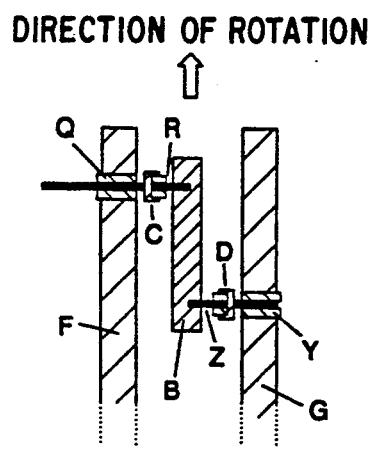
Figure 11C:
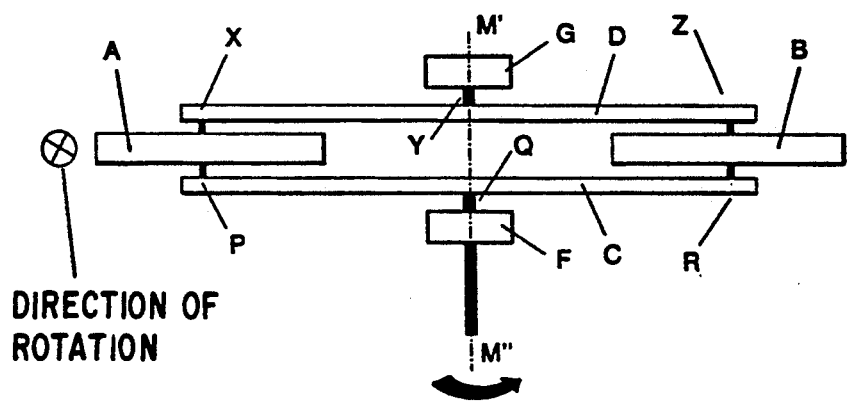
Figure 12A:
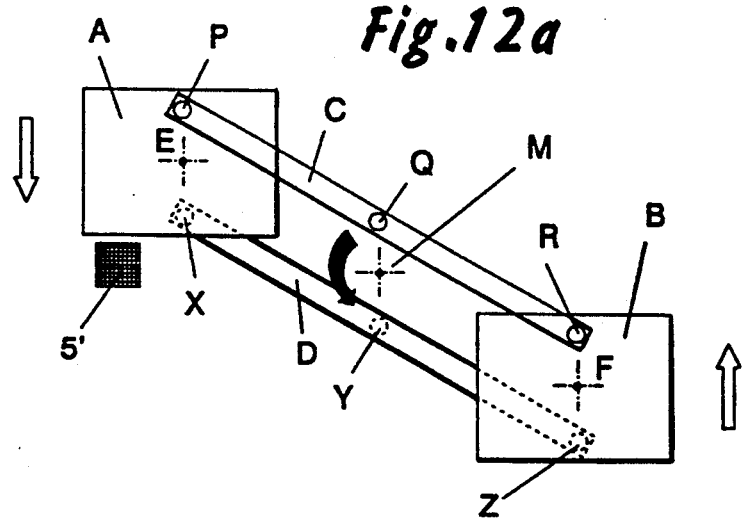
Figure 12B:
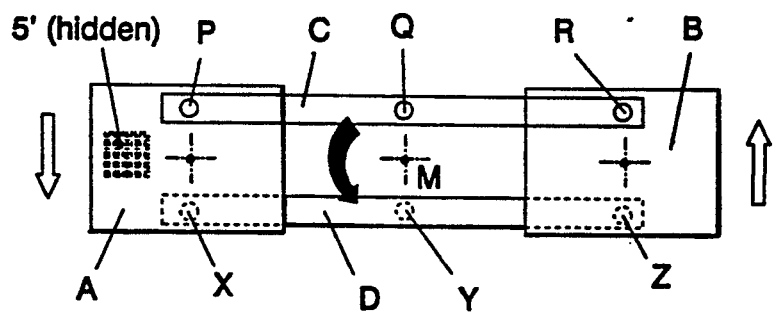
Figure 12C:
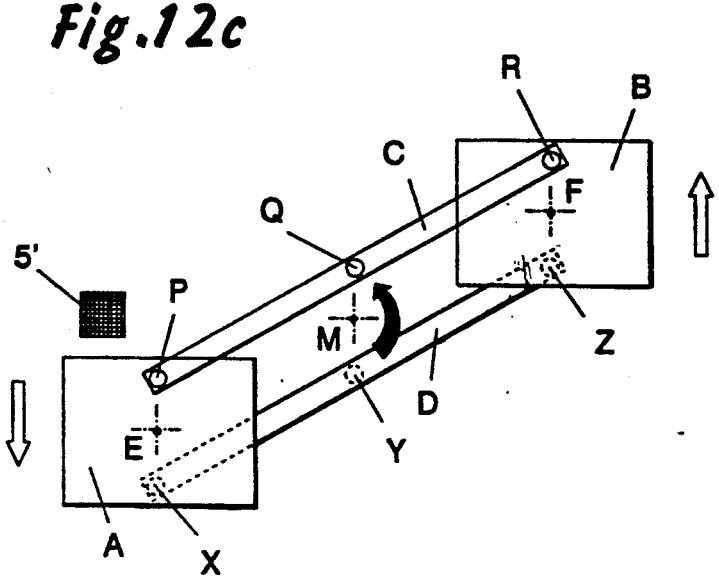

In order that the invention may be clearly understood and readily carried into effect, some embodiments thereof will now be described, by way of example only, with reference to the accompanying drawings of which:

FIGS. 1 and 2 show, schematically, a first embodiment of the invention,

FIGS. 3 and 4 show a development of the embodiment described with reference to FIGS. 1 and 2, FIGS. 5, 6 and 7 show a further development of the invention, FIG. 8 illustrates how deflection may be achieved in two directions, FIG. 9 shows a more efficient technique for bi-directional deflection, FIGS. 10a and 10b show, in general outline, a problem associated with conventional chopping mechanisms and an improved chopping movement respectively;

FIGS. 11a, 11b and 11c show in elevation, cross-section and plan respectively, views of an examplary embodiment of the improved movement;

FIGS. 12a, 12b, and 12c show in elevation view various sequential stages in the movement of a chopping device, of the kind described with reference to FIG. 11a, relative to a matrix of detector elements;

FIGS. 13a and 13b show in elevation and plan, respectively, a cell intended for use to expose a matrix of detector elements to a region of interest;

FIGS. 13c and 13d show in elevation a set of four cells intended for use to expose a matrix of detector elements to a region of interest, and FIGS. 14a and 14b, 15 and 16 show constructional details and components of a system incorporating the cells described with reference to FIGS. 13a, 13b, 13c and 13d and upper and lower discs for supporting and moving the cells.

In the simplest implementation of the invention, as illustrated in sectional end elevation in FIG. 1, an optical chopper 1 having two apertures 2, 3 is provided with a refractive wedge 4 overlying one of the apertures (2), such that infra-red energy passing through aperture 2 on to a pyroelectric matrix 5, comprising an array of detectors elements respensive to said energy, is displaced when passing through the wedge 4 but not when the chopper has rotated through 180° and the infra-red energy passes through the open aperture, 3, as illustrated in FIG. 2.

The above system can be improved, as shown in FIGS. 3 and 4, by the provision adjacent aperture 3 of a parallel-faced plate 6 of the same material—and having the same mean thickness—as the wedge 4, in order to create an optical path having similar characteristics as that of the wedge, thereby compensating for the small optical losses which occur in the wedge (by reflection, scattering and absorption).

A further enhancement is shown in FIGS. 5 and 6 in which a pair of wedges 4a and 4b are used to re-direct the infra-red energy in alternate directions: this "balanced" system improves the chromatic and optical aberration in the system and distributes any residual aberrations equally between the two apertures. A front elevation view of the balanced refractive interlacing chopper is shown in FIG. 7.

Re-direction of the incident infra-red energy by the refractive element is not limited to a single direction; by the serial use of a pair of wedges, 4c and 4d, arranged with their taper directions at right-angles in the plane as shown in FIG. 8, the incident infra-red energy can be displaced in both the x and y directions sequentially.

A simpler implementation of bi-directional deflection utilises an asymmetrical wedge 4e (FIG. 9), having the exit face tapered in both x and y directions so as to provide simultaneous displacement of the infra-red energy in both x and y directions accordingly. This provides a more efficient optical system than that of FIG. 8, because of the reduction in the number of interfaces in the optical path.

As will be obvious, further enhancements or embodiments can utilise a greater number of elements than the single pair shown in FIG. 7, so as to provide a multi-element chopper, or the simultaneous use of two or more choppers acting synchronously. It is also evident that optical aberrations can be reduced by use of various geometrical modifications to both the wedge shapes themselves (such as an inverse conical surface) or to the manner of their support.

For some applications, the optical performance of the foregoing embodiments can be insufficient due to degradation caused to the image of the scene at the detector as a result of the widely different optical path length through the wedge at different points in the converging beam, and at differing points in the image field.

For such applications, a more satisfactory technique is to substitute a plane-parallel tilted plate for the wedge element, the effect of which produces a useful displacement of the beam with only a small amount of asymmetric aberration. The plate can be tilted in any direction to achieve two-dimensional interlace as required.

Because of the requirement to include a infra-red energy chopper which will rotate about an axis decentred and parallel with the axis of the imaging lens, it is efficient and desirable to include the interlacing plate or plates on the rotating chopper. For a suitably small decentring, and to avoid movement of the scene image on the focal plane during the open phase, the tilted plate becomes a thick, parallel sided cone, although there is, of course, a practical problem in fabricating such a plate, because of the conical shape. It is much easier to fabricate a spherical lens, and thus it is appropriate and convenient to replace the wedges 4 of previously described embodiments with decentred spherical lenses. The radius and thickness of the base lens are selected to minimise the loss in image quality.

The above-described invention may be used to good advantage in the arrangement now to be described with reference to FIGS. 10 through 16.

A conventional single-phase (i.e. one light frame and one dark frame per rotation) or two-phase (two-bladed) rotary chopper is very simple to implement and operate, but gives rise to a substantial error or non-uniformity in the way in which the pyroelectric matrix is exposed to, and occluded from, the scene, as is indicated in FIG. 10, which shows a plan view of a pyroelectric detector matrix 5' of 100×100 elements which is about to be occluded by a rotating conventional chopper blade. Referring to this diagram, it can be seen that the innermost element in line 1 (D100,1) is occluded before the outermost element (D1,1) in that line. Further the reverse is true at the lowest line of the matrix and thus element D1,100 is occluded significantly earlier than is element D100,100.

It is convenient and efficient to configure the electronic circuitry used for interrogation and processing such that the detector elements in each line are all sampled simultaneously. As a consequence, assuming such sampling is effected, there is a phase "error" (shown as distance d in FIG. 10a) associated with this type of chopper which varies spatially over the surface of the matrix (reducing to zero only at the centre line). The combined effects of this phase "error" and the desire to sample whole lines of detector elements simultaneously is to cause asynchronicity between the effect of the chopper and the electronic sampling of the detector signals, which causes variations between pixels in their effective exposure times (and also in the mark-space ratio of the exposure and occlusion periods), and this is manifest as an apparent spatially-dependent variation in element responsivity across the matrix. For example, if the matrix is 10×10 mm, and centred 30 mm from the centre of rotation of a conventional chopper having a 38 mm radius, the angle subtended by the matrix is ca. 11.3°, hence d is 2 mm. This corresponds to a phase "error" of 20 elements i.e. 20% of the matrix height.

Ideally, the chopper blade should operate as shown in FIG. 10b, and move across the detector matrix in a linear fashion, parallel to the lines of elements, from A to B, causing all of the elements in a given line to be occluded simultaneously after the chopper has traversed the matrix.

The arrangement to be described in the following provides a linear-action, rotary, optical chopper without any reciprocating mechanisms, hence it provides an "ideal" chopping action as described above and is relatively free of mechanical vibration. In addition, it is particularly suitable for use with an optical interlacing system according to the invention requiring only the addition of simple refractive elements, such as wedges or plates.

FIGS. 11a–11c show, for the purpose of example only, a simple embodiment of the arrangement. It comprises two chopper blades, A and B, mounted via rotary bearings and spindles P and R respectively to an arm C, and via bearings/spindles X and Z respectively to an arm D. Arms C and D are mounted via respective bearings/spindles Q,Y to two different plates F,G which are attached to a common frame or chassis. Arm C is connected via Q to the uppermost frame plate F and arm D is connected via Y to the other (lower) frame plate G. This is best seen in FIG. 11b. The relative positioning of bearing P, with respect to X, is identical to the positioning of Q with respect to Y, as is R with respect to Z.

In this example, bearings P, Q and R are positioned directly above bearings X, Y and Z respectively in the front x-y plane (i.e. as viewed in FIG. 11a). Point E lies on blade A centrally between P and X, and is the centre of rotation (c-o-r) of the blade, as will become apparent. Similarly, point F is the c-o-r of blade B. Point M lies centrally between Q and Y, and is the location of the major axis of rotation of the whole system, which lies orthogonally with respect to the paper in FIG. 11a and is shown as M'-M" in FIG. 11c. The chopper system is free to rotate, with arms C and D able to pivot around Q and Y respectively. It can be driven by rotating either or both of the spindles attached to arms C and D, and in the FIG. 11 arrangement, spindle Q is driven rotationally by external means, causing the whole assembly to rotate.

The dynamic operation of the chopper mechanism is illustrated in FIG. 12, which also includes, for the purpose of illustration only, a representation of an appropriately positioned pyroelectric matrix 5'. FIGS. 12a, 12b and 12c show the chopper elements in a series of three positions during approximately 90° rotation of the assembly in an anticlockwise direction. Spindle Q is the "driven shaft", causing arm C to rotate anticlockwise. This is linked to arm D by the two blades A, B and associated bearings/spindles (P,R,X,Z); arm D is caused to rotate synchronously around its c-o-r, Y, and each blade (A,B) is caused also to move around the major axis of rotation, M'-M", synchronously and in the same (anti-clockwise) direction. However, each blade is also caused to rotate around its own c-o-r (E for blade A; F for blade B) in the opposite direction to that of the arms of C,D, such that the overall effect is to maintain the orientation of the blades with respect to all coordinate planes. As a consequence, each blade is swept across the detector matrix 5' in an "ideal" manner (FIG. 10b) with the blade edge always substantially parallel to the lines of elements in the detector matrix as it either exposes or occludes them. There is thus substantially no phase "error".

The mechanism additionally permits the optical interlacing function to be achieved by means of a simple refractive wedge or tilted plate as described above. The wedge or plate may be deployed in suitable cells and substituted for the blades A and B in FIG. 11, which are then moved with constant x-y orientation over the detector matrix. Thus:

(a) simple wedges or plates can be used as the refractive elements (rather than elements possessing radial symmetry such as cones or de-centred lenses), therefore there are no associated optical aberrations and the elements are easy to manufacture at low cost;

(b) the shape of the elements may be rectangular (again, affording simple fabrication at low cost), and are thus easy to mount and align.

The above descriptions of the linear-action chopper have been intended for the purpose of describing the principle of operation. In practice, any or all of several enhancements may be incorporated to make the system more efficient, or more elegant in operation. These include the following:

(1) Typically, a four-phase interlace is considered to be one of the most useful configurations (that is to say, there will be four relatively-displaced images per displayed frame), and this requires the use of four rotating cells, each supporting a refractive element and possessing well-defined blade edges. Rather than use two pairs of rotating arms, it is preferable to use a pair of rotating discs to support and drive the four cells, as is described below.

(2) The incoming image infra-red energy must be occluded from the detector matrix during the "dark frame" cycle, hence there must be provision to incorporate optical screening between the cells as they pass over the matrix. This can be achieved by making the cells sufficiently "tall", and providing an overlap system between each adjacent pair (such as a pair of complementary, mating chamfers). Alternatively, one of the support/drive discs can be made sufficiently large to screen the inter-cell spaces, provided that it possesses an adequate aperture for the cells to be "visible" through it as they pass over the detector matrix. This, also, is described below.

(3) The bearing/spindle locations of the rotating cells can be positioned symmetrically in the x-direction (i.e. above and below the optical apertures), or can be offset such that the cells are non-symmetrically mounted, and appear to "emerge" from the disc sandwich along one side: this can be advantageous in enabling the cells to be positioned very closely to the detector plane in order to maximise efficiency by reducing the shadowing effects. A preferred practical implementation of a linear-action non-reciprocating rotary optical four-phase interlacing chopper is depicted in FIGS. 13 to 16, together with typical dimensions of the critical features for application with a 10×10 mm array, where the chopper/interlace system is situated about 3 mm in front of the focal-plane, and an f0.8 lens system is used, i.e. the effective matrix area is approximately 14×14 mm.

FIG. 13a illustrates a cell 10 which is capable of carrying a refractive optical element 4', such as a wedge or inclined plate. The left-hand side of the cell is a lightweight frame 11 for supporting the optical element, which is counterbalanced by a weight 12 on the right-hand side of the cell. Situated between the frame and balance-weight are two spindles 13 and 14, one projecting upwards and the other projecting downwards, for attachment of the cell to two rotating discs (not shown in this Figure but shown at 16 and 17 in FIGS. 14–16). The cell dimensions are chosen to effect a 50:50 light-dark ration for a 14×14 mm area, without inter-cell collision during rotation. In order to ensure that collisions do not occur, the cell dimensions must be carefully calculated, and it is advantageous to offset spatially the plane of the balance weight from the plane of the opposite edge of the cell, as is shown in FIG. 13. The c-o-r of the cell lies mid-way between the two cell spindles, and is marked with a centre-line cross at 15. The distance between the spindles is the same as that of the offset between the axes of rotation of the two discs. Each cell incorporates sharp blade-edges at the uppermost and lowermost edges of the optical element, in order to provide a well-defined shutter action.

The cells are caused to rotate such that the c-o-r of each cell moves in a circular fashion at a distance, in this instance, of 22.6 mm around the major axis of rotation, M (see FIG. 13c). Four cells of this type (21–24) are fitted with the appropriately-orientated optical elements, and are connected, via their respective spindle-pairs, to bearings on the pair of offset, rotating discs, 16,17 (FIGS. 14–16) each cell having one spindle attached to the "lower" disc, and one spindle attached to the "upper" disc. FIGS. 13c and 13d show the arrangement in different rotational positions such as to occlude the array 5' to the region of interest through the cell 21 respectively. The reference numbers given to the cells bear primes in FIG. 13d to indicate that their spatial positions have changed relative to those shown in FIG. 13c.

Figure 14A:
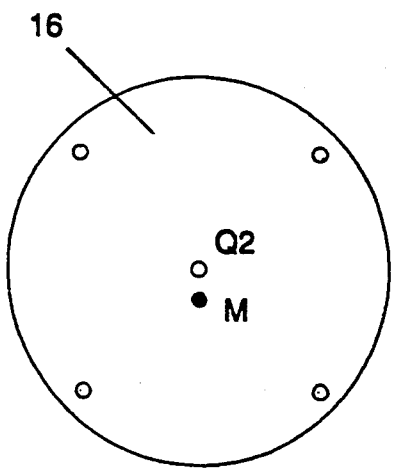
Figure 14B:
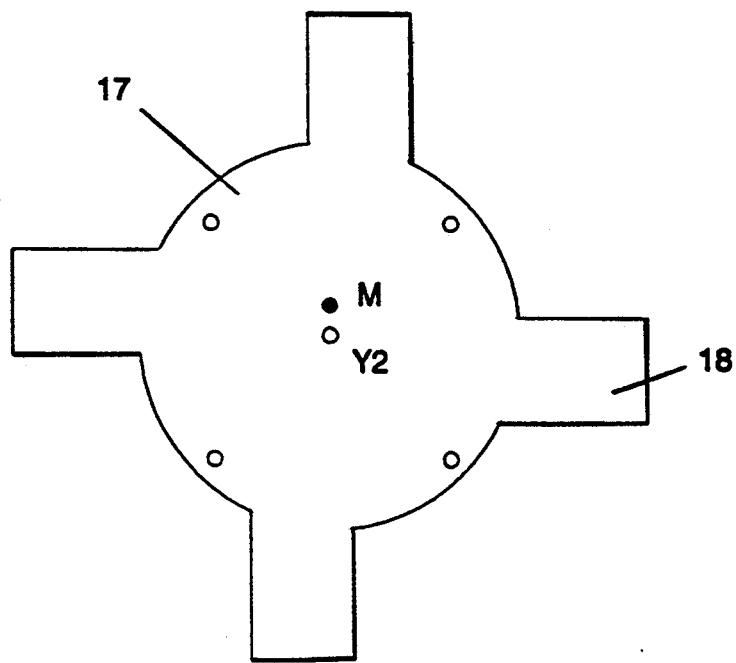
Figure 15:
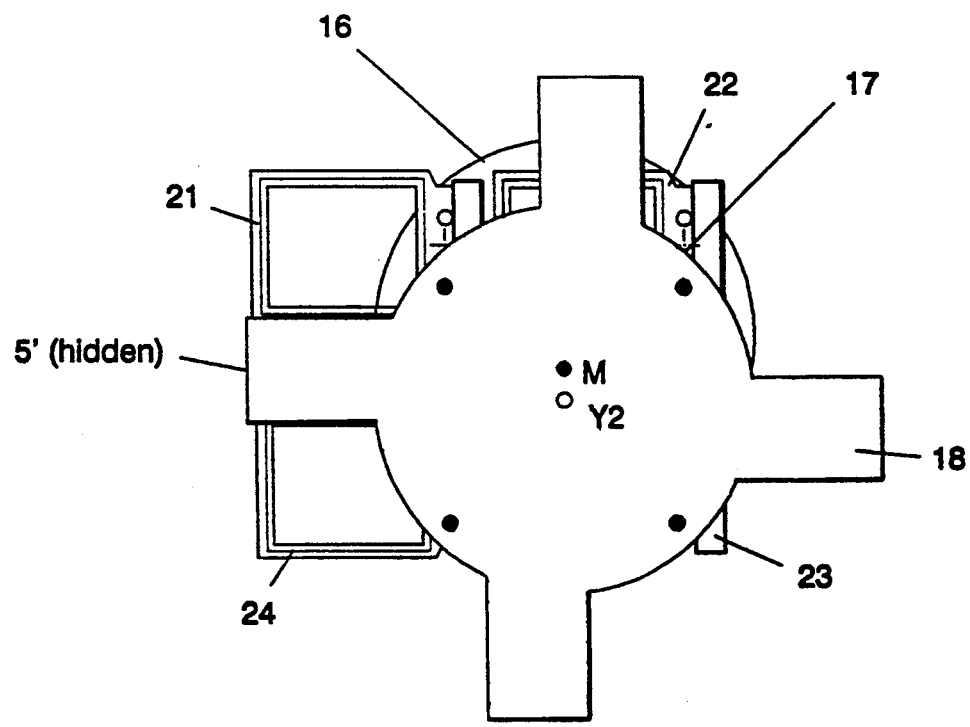
Figure 16:
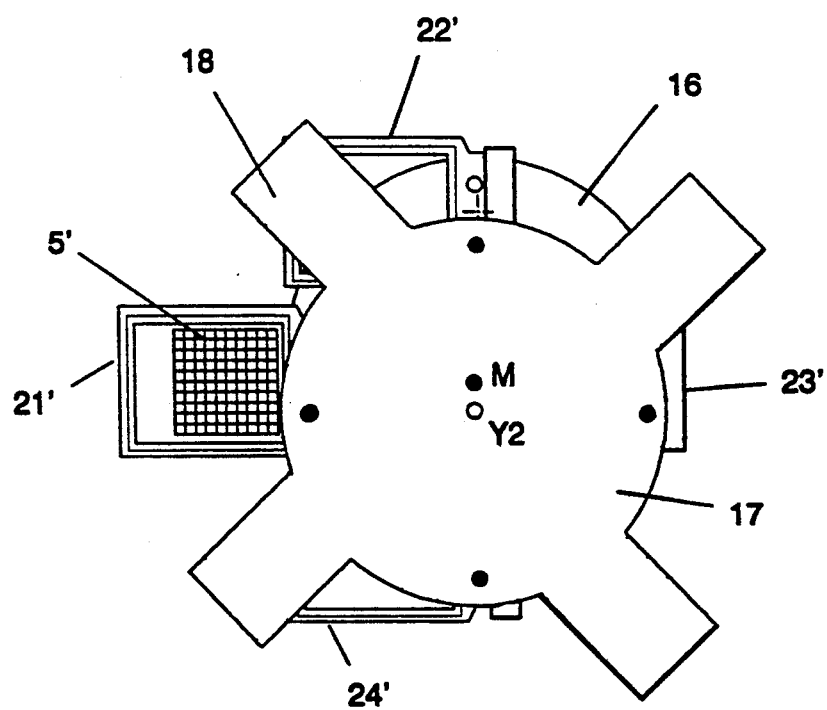

A suitable pair of discs for supporting and driving the cells is shown in FIG. 14. These have been termed "upper" and "lower" for convenience, because the cells such as 10 shown in FIG. 13 are attached to, and on top of, the "lower" disc, and then the "upper" disc is attached to, and on top of, the cells, thus forming a sandwich-type assembly. M represents the major axis of rotation and Q2 represents the axis of rotation of the "lower" disc 16 (FIG. 14a). The "upper" disc 17 (FIG. 14b) possesses four fin-like projections such as 18 in order to provide inter-cell blanking, as is made clear in FIGS. 15 and 16, which show, respectively, and in correspondence with FIGS. 13c and 13d, the dark-phase and light-phase positions of the chopper-interlace assembly in relation to a matrix 5' of detector elements. M represents the major axis of rotation and Y2 the axis of rotation of the disc 17.

Thus, in this arrangement, not only the occlusion of the matrix 5' by projections such as 18 but also the exposure of the matrix through the cells such as 10 is achieved progressively and orthogonally to the upper and lower lineal boundaries of the matrix.

In another construction, the inter-cell blanking is provided by adding fins to the uppermost and lowermost edges of the cells such as 10 themselves, appropriately offset in the plane so as to avoid collision, or by the provision of four additional blades (or blank cells) to the whole assembly, such that there would be eight elements, in all, attached between the two discs. Moreover, each cell can be fitted with wavelength-selective optical filters, either in addition to, or in lieu of the interlacing elements, such that the pyroelectric matrix is exposed to the scene alternately through different filters. This enables a "false-colour" picture of the scene to be generated. Similarly, each cell can be fitted with infra-red energy polarizing filters, enabling a "polarization dependent" picture of the scene to be generated.

It will be appreciated that differing constructions can be devised to correlate with differing requirements in terms of desired matrix and/or electronic circuitry configurations without departing from the scope of the present invention.

A construction somewhat similar to that described with reference to some of FIGS. 10 through 16 hereof is envisaged in U.S. Pat. No. 4,073,576, to which attention is invited.

We claim:

1. An infra-red imaging arrangement comprising:

an array of detector elements responsive to infra-red energy;

means for constraining said energy as received from a region of interest to impinge upon said array; and a chopping device for periodically blocking exposure of said array to said energy, said chopping device comprising:

a plurality of individually-mounted cells each having an optical component-containing infra-red energy-transmissive portion;

a non-reciprocating rotary mechanism for moving said cells with constant orientation and in a direction substantially orthogonal to a side of said array sequentially and cyclically into alignment with said array for exposing said array to said energy through successive optical components, a preceding optical component differing from a sequentially succeeding optical component such as to shift said energy relative to said array when said array is exposed therethrough as compared with when said array is exposed through said sequentially succeeding optical component to increase the ability of said array to resolve spatially sources of said energy in said region; and infra-red energy-blocking means coupled to said non-reciprocating rotary mechanism for preventing exposure of said array to said energy other than through said optical components.

2. An arrangement according to claim 1 wherein at least one of said optical components comprises a wedge-shaped component arranged to shift said energy in a selected direction relative to said array.

3. An arrangement according to claim 1 wherein at least one of said optical components comprises a parallel-faced plate.

4. An arrangement according to claim 3 wherein said plate is tilted with respect to the direction of incidence of said energy.

* * * * *